(12) United States Patent
Ozawa et al.

(10) Patent No.: US 9,962,887 B2
(45) Date of Patent: May 8, 2018

(54) METHOD OF MANUFACTURING FIBER SUBSTRATE AND METHOD OF MANUFACTURING RESIN ROTATOR

(71) Applicant: Shin-Kobe Electric Machinery Co., Ltd., Tokyo (JP)

(72) Inventors: Masaya Ozawa, Tokyo (JP); Masao Sugiyama, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 769 days.

(21) Appl. No.: 14/335,983

(22) Filed: Jul. 21, 2014

(65) Prior Publication Data

US 2016/0016367 A1 Jan. 21, 2016

(51) Int. Cl.
| | | |
|---|---|---|
| *B29C 70/48* | (2006.01) | |
| *B29C 43/56* | (2006.01) | |
| *B29C 43/34* | (2006.01) | |
| *B29C 43/02* | (2006.01) | |
| *B29C 70/54* | (2006.01) | |
| *B29C 43/18* | (2006.01) | |

(Continued)

(52) U.S. Cl.
CPC .......... *B29C 70/48* (2013.01); *B29C 43/027* (2013.01); *B29C 43/18* (2013.01); *B29C 43/34* (2013.01); *B29C 43/56* (2013.01); *B29C 70/545* (2013.01); *B29C 2043/029* (2013.01); *B29C 2043/3488* (2013.01); *B29C 2043/563* (2013.01); *B29K 2101/10* (2013.01); *B29K 2105/12* (2013.01); *B29K 2277/10* (2013.01); *B29K 2705/12* (2013.01); *B29L 2015/003* (2013.01)

(58) Field of Classification Search
None
See application file for complete search history.

(56) References Cited

U.S. PATENT DOCUMENTS 2,947,356 A * 8/1960 Hornbostel ............... D21F 1/46
162/276
2001/0030381 A1* 10/2001 Kobayashi ............ B29C 70/345
264/257

FOREIGN PATENT DOCUMENTS

| JP | 11-227061 A | 8/1999 |
|---|---|---|
| JP | 2001-1413 A | 1/2001 |

(Continued)

*Primary Examiner* — Christina Johnson
*Assistant Examiner* — Mohammad M Ameen
(74) *Attorney, Agent, or Firm* — Fitch, Even, Tabin & Flannery LLP (57) ABSTRACT

There is little fluctuation in amount of short fibers among individual products of fiber substrate. No damage is caused to a mold for the fiber substrate. Continuous production of the fiber substrates is possible. A method of manufacturing a fiber substrate includes the steps of: preparing slurry by dispersing short fibers in a dispersion medium; pouring the slurry into a cylindrical mold from above the cylindrical mold, the slurry being directed to a slurry diffusion member disposed in the center of the cylindrical mold and having an upward pointing conical or pyramidal shape; pouring the dispersion medium or water onto the slurry diffusion member from above the slurry diffusion member to cause the short fibers adhering to the slurry diffusion member to fall down, after the step of pouring the slurry; and discharging the dispersion medium from the cylindrical mold to accumulate the short fibers in the cylindrical mold to obtain a fiber aggregate.

20 Claims, 5 Drawing Sheets

(51) Int. Cl.
*B29K 101/10* (2006.01)
*B29K 105/12* (2006.01)
*B29L 15/00* (2006.01)
*B29K 705/12* (2006.01)

(56) References Cited

FOREIGN PATENT DOCUMENTS

| | | | | |
|---|---|---|---|---|
| JP | 2001-295913 A | 10/2001 | | |
| JP | 2005-96173 A | 4/2005 | | |
| JP | 2007-138146 A | 6/2007 | | |
| JP | 2011-152729 | * 8/2011 | ............ | B29C 43/34 |
| JP | 2011-152729 A | 8/2011 | | |

* cited by examiner

Fig.5

METHOD OF MANUFACTURING FIBER SUBSTRATE AND METHOD OF MANUFACTURING RESIN ROTATOR

TECHNICAL FIELD

The present invention relates to a method of manufacturing a fiber substrate using a filtering-dehydration system, and to a method of manufacturing a resin rotator made of the fiber substrate manufactured by the method.

BACKGROUND ART

A resin rotator in which a resin is retained in a fiber substrate has high durability, and is suitably used as the material of a resin gear or the like for use in vehicle components, industrial components, and so forth.

JP 2001-295913 A describes a fiber substrate for fabrication of a resin gear. The fiber substrate is formed by weaving or knitting a thread into a tubular member and rolling the tubular member inside out from an end portion into a doughnut shape. JP 2001-295913 A also describes a resin gear formed by forming teeth on the fiber substrate which is impregnated with a resin so that the resin is retained in the fiber substrate.

JP 2001-295913 A further describes a construction in which two fiber substrates are superposed in a mold with a metal bushing interposed between the two fiber substrates in order to improve the bonding strength between the fiber substrates and a retainer provided in the metal bushing.

JP 11-227061 A describes a doughnut-shaped fiber substrate that is different from the doughnut-shaped fiber substrate discussed above, and describes a method of manufacturing a resin gear, in which a formed sheet formed from a thermosetting resin and short fibers by a filtering-dehydration system, is pressed into formed sheet pieces, and a plurality of the formed sheet pieces are stacked and are heated and pressurized in a mold.

In the resin gears described in JP 2001-295913 A and JP 11-227061 A, the fibers are hardly tangled at the superposition interface between the two fiber substrates or the stacking interface between the formed sheet pieces, and separation may be easily caused at the interface depending on the usage.

In addition, the bonding strength between the fiber substrates and the metal bushing may be insufficient. Therefore, the durability of the resin gears may be insufficient depending on the usage.

In order to address such issues, it is proposed to produce an aggregate of short fibers by a filtering-dehydration method using a mold.

JP 2001-001413 A discloses a method of manufacturing an aggregate of short fibers and a thermosetting resin in which slurry containing a mixture of short fibers and a thermosetting resin is pressure- or vacuum-dehydrated in a water-permeable mold.

However, a thermosetting resin that can be dispersed in water has low flowability and does not provide sufficient wettability at the interface between the thermosetting resin and the fibers, and therefore does not provide durability suitable for practical use.

JP 2005-096173 A discloses a method of fabricating a fiber-reinforced resin complex. In the method, charging of short fibers and pouring of a resin are performed in the same mold having a fluid outlet port and the short fibers and the resin are heated and pressurized in the mold.

In the method, however, it is difficult to dispose a metal bushing in a center portion of a resin rotator. In addition, the poured resin may leak through the entire mold which is formed from a wire net or the like, thereby making it difficult to take out a formed object after the resin has been cured. Moreover, the mold may be clogged, and may not be used over and over (continuous production).

JP 2007-138146 A discloses a method of manufacturing a resin gear. In this method, a seamlessly formed cylindrical fiber substrate, which is obtained by a filtering-dehydration method, is heated and pressurized as an aggregate of short fibers in a mold.

However, JP 2007-138146 A does not disclose at all a method that improves the bonding strength between the fiber substrate and a metal bushing.

In order to address the issues of JP 2001-001413 A, JP 2005-096173 A, and JP 2007-138146 A discussed above, JP 2011-152729 A describes a method of fabricating a fiber substrate by using the same mold and apparatus, in which short fibers are accumulated around the outer peripheral portion of a metal bushing by a filtering-dehydration method to fabricate a fiber aggregate that surrounds the outer peripheral portion of the bushing, and thereafter the fiber aggregate is compressed by driving a pressing machine in the vertical direction which corresponds to the axial direction of a rotary shaft.

In the fabrication, a thermosetting resin is not used in the filtering-dehydration method to fabricate the fiber aggregate, but the fiber aggregate is impregnated with the thermosetting resin after the formation of the fiber aggregate. Thus, sufficient wettability is provided at the interface between the resin and the fibers. The metal bushing can be easily disposed in a center portion of a resin rotator, which eliminates the risk of a resin leak. In addition, the bonding strength between the fiber substrate and the metal bushing can be improved.

In the fabrication described in JP 2011-152729 A, however, slurry is poured onto a member called "upper support member", and short fibers may remain on the "upper support member". In such a case, the amount of short fibers per product may be fluctuated. Further, the short fibers may be caught in a gap between molds when compressing the fiber aggregate, which may break the molds to interrupt continuous production.

It is an object of the present invention to provide a method of manufacturing a fiber substrate that suffers little fluctuation in amount of short fibers among individual products and causes no damage to the molds to enable continuous production.

It is also an object to provide a method of manufacturing a resin rotator and a resin rotator manufactured by the method in which a fiber substrate is impregnated with a resin and the resin is cured.

SUMMARY OF INVENTION (1) A method of manufacturing a fiber substrate includes the steps of:

preparing slurry by dispersing short fibers in a dispersion medium;

(a) pouring the slurry into a cylindrical mold from above the cylindrical mold, the slurry being directed to a slurry diffusion member disposed in the center of the cylindrical mold and having an upward pointing conical or pyramidal shape;

(b) pouring the dispersion medium or water onto the slurry diffusion member from above the slurry diffusion member to cause the short fibers adhering to the slurry diffusion member to fall down, after the step of pouring the slurry; and (c) discharging the dispersion medium from the cylindrical mold to accumulate the short fibers in the cylindrical mold to obtain a fiber aggregate.

(2) The method of manufacturing a fiber substrate according to (1), further including the step of (d) compressing the fiber aggregate during or after the step (c) of discharging the dispersion medium.

(3) The method of manufacturing a fiber substrate according to (1) or (2), in which the step (c) of discharging the dispersion medium is performed under a reduced-pressure atmosphere.

(4) The method of manufacturing a fiber substrate according to (2), in which in the step (d) of compressing, the compression of the fiber aggregate is performed while applying heat.

(5) The method of manufacturing a fiber substrate according to any one of (1) to (4), in which the fiber aggregate is shaped like a gear in the cylindrical mold.

(6) A method of manufacturing a resin rotator, including the step of (e) impregnating the fiber substrate manufactured by the method according to any one of (1) to (5) with a resin and curing the resin.

(7) The method of manufacturing a resin rotator according to (6), further including the step of (f) performing tooth cutting on an outer peripheral portion of the fiber substrate after the step (e) of impregnating and curing.

According to the present invention, a dispersion medium or water is poured onto the slurry diffusion member to cause the short fibers adhering to and remaining on the slurry diffusion member to fall down. This makes the weight (mass) of the fiber substrate to be manufactured uniform, and prevents the short fibers from being caught in a gap between molds to enable continuous production. This also extends the life of the mold.

If the step (c) of discharging the dispersion medium from the cylindrical mold and the step (d) of compressing the fiber aggregate are performed at the same time, the time for one step can be saved, and thus the fiber substrate can be manufactured in a shorter time.

If the step (c) of discharging the dispersion medium is performed under a reduced-pressure atmosphere, the dispersion medium can be discharged in a shorter time.

If the step (d) of compressing the fiber aggregate is performed while applying heat, the dispersion medium contained in the fiber aggregate can be discharged in a short time as in the case where the discharging of the dispersion medium can be performed under a reduced-pressure atmosphere. If heat is applied under a reduced-pressure atmosphere, the dispersion medium can be discharged in a further shorter time.

If the fiber aggregate is shaped like a gear in the cylindrical mold, a subsequent cutting step can be simplified when the final product to be fabricated is a gear, which improves the material yield.

In the resin rotator according to the present invention, the weight of the fiber substrate is uniform. Thus, the resin rotator has uniform strength and high durability, and can be used as a resin rotator that can endure high-temperature high-load use conditions in vehicle components, industrial components, and so forth.

BRIEF DESCRIPTION OF DRAWINGS

FIGS. 2A and 2B illustrate a metal bushing of the resin gear illustrated in FIG. 1, in which

DESCRIPTION OF EMBODIMENTS

Before describing a method of manufacturing a fiber substrate according to the present invention, an example of a filtering-dehydration compressor for use in the manufacturing method will be described below.

<Filtering-Dehydration Compressor>

As illustrated in FIGS. 3A-3D, for example, a filtering-dehydration compressor 13 for use in the method of manufacturing a fiber substrate according to the present invention includes a base 1, a lower hollow compression mold 2, a cylindrical mold 3, and an upper hollow compression mold 4.

The lower hollow compression mold 2 includes a bushing support member 5 and a lower elastic member 6 provided inside the lower hollow compression mold 2. The cylindrical mold 3 includes a slurry diffusion member 7 provided inside the cylindrical mold 3. The upper hollow compression mold 4 includes a depressing member 8 and an upper elastic member 9.

The individual members will be described in detail below.
(Base)

The base 1 supports the entire filtering-dehydration compressor. The lower hollow compression mold 2 is directly placed on the upper surface of the base 1. The base 1 is not specifically limited as long as the lower hollow compression mold 2 can be horizontally placed on the base 1 and the base 1 is rarely distorted by the load.

The material of the base 1 is not specifically limited, and may be stainless steel, carbon steel, aluminum, an aluminum alloy, a magnesium alloy, or the like. From the viewpoint of corrosion resistance, use of stainless steel is preferable.

The size of the base 1 is not specifically limited. If the entire filtering-dehydration compressor is accommodated in the projection area of the base 1 on the horizontal plane, the installation location of the filtering-dehydration compressor can be easily determined.

The base 1 may be provided with counter bores and through holes for weight reduction as long as the rigidity of the base 1 can be secured.
(Lower Hollow Compression Mold)

The lower hollow compression mold 2 is installed on the upper surface of the base 1 discussed above. The lower hollow compression mold 2 may be installed by bolts, grooves, fitting, welding, and various other methods. For ease of disassembly, use of bolts is preferable.

A hollow portion 2A that is open in the vertical direction is provided inside the lower hollow compression mold 2. The bushing support member 5, on the upper surface of which a bushing 31 is to be placed, is disposed in the hollow portion 2A.

The lower surface of the bushing support member 5 is supported by the lower elastic member 6 provided on the base 1 to extend upright. The height of the bushing support member 5 from the base 1 can be varied through expansion and contraction of the lower elastic member 6. The lower elastic member 6 may be provided indirectly on the base 1 to extend upright, rather than provided directly on the base 1 to extend upright. A plurality of lower elastic members 6 may be installed.

The lower elastic member 6 may be any member that expands and contracts to vary the height of the bushing support member 5 as discussed earlier, and may be a coil spring, a disk spring, a plate spring, a molded member of natural or synthetic rubber, or the like. Under use conditions in which the elastic member is subjected to a strong compressive force, however, a spring is preferably used in terms of the durability. The material of the spring is not specifically limited. However, a spring made of stainless steel with high corrosion resistance and a spring that has been rust-proofed are preferably used. A spring made of rubber or the like may also be used.

A bushing 31 is to be placed on the upper surface of the bushing support member 5. The bushing support member 5 is preferably provided with a groove on the upper surface that prevents displacement of the bushing 31. If the bushing is made of a magnetic material, a magnet may be provided on the upper surface of the bushing support member 5 in place of a groove.

The bushing support member 5 and the lower elastic member 6 may be bonded or secured to each other. However, the bushing support member 5 and the lower elastic member 6 are preferably removably connected to each other so that the bushing support member can be exchanged according to the type of the bushing.

The lower hollow compression mold 2 and the bushing support member 5 are arranged such that at least a portion of the bushing support member 5 is inserted into the hollow portion 2A of the lower hollow compression mold 2 as seen in the horizontal direction, and the amount of insertion of the bushing support member 5 into the hollow portion 2A is varied through expansion and contraction of the elastic member 6. In an arrangement, the bushing support member 5 may be moved out of the hollow portion 2A of the lower hollow compression mold 2 as seen in the horizontal direction through expansion of the elastic member 6 during normal operation. Such an arrangement is not practical because displacement may be caused when the bushing support member 5 is moved back into the lower hollow compression mold 2 through contraction of the elastic member 6.

A stepped portion 10 is provided on the inner wall of the lower hollow compression mold 2 which defines the hollow portion 2A. The stepped portion 10 contacts the lower portion of the bushing support member 5 to hinder a descent of the bushing support member 5 through contraction of the lower elastic member 6. The stepped portion 10 is preferably formed by varying the inside diameter of the hollow portion 2A or providing projections on the inner wall.

The stepped portion 10 is not necessarily provided over the entire circumference of the inner wall, and may be provided on a part of the inner wall. If the stepped portion 10 is provided on a part of the inner wall, the stepped portion 10 is preferably provided at three or more locations at equal angular intervals in order to keep the bushing support member 5 horizontal. Specifically, the stepped portion 10 may be provided at three locations at intervals of 120 degrees, at four locations at intervals of 90 degrees, or at six locations at intervals of 60 degrees as the hollow portion is seen from the upper and lower openings.

The position of the stepped portion 10 can be varied according to the final thickness of the fiber aggregate. Fiber substrate layers with an equal thickness in the vertical direction are preferably formed to extend from the center of the bushing 31 in the thickness direction. Specifically, the stepped portion 10 of the lower hollow compression mold 2 and a stepped portion 11 of the upper hollow compression mold 4 to be discussed later are preferably located such that the distance from the upper end of the lower hollow compression mold 2 to the center of the bushing 31 in the thickness direction with the stepped portion 10 of the lower hollow compression mold 2 and the bushing support member 5 contacting each other is equal to the distance from the lower end of the upper hollow compression mold 4 to the center of the bushing 31 in the thickness direction with the stepped portion 11 of the upper hollow compression mold 4 and the depressing member 8 contacting each other.

Slurry to be discussed later is poured on a portion of the upper surface of the lower hollow compression mold 2 excluding the upper opening of the hollow portion. Therefore, discharge ports 12 are preferably provided in the upper surface of the lower hollow compression mold 2 to discharge a liquid content in the slurry. More preferably, a pump for vacuum suctioning is connected to the discharge ports 12. If the lower hollow compression mold 2 thus configured is used, the formation time can be further shortened.

(Cylindrical Mold)

The cylindrical mold 3 has upper and lower openings. The lower hollow compression mold 2 is inserted into the lower opening of the cylindrical mold 3 to tightly contact the outer periphery of the lower opening so that the slurry will not leak out of the mold 3. The upper hollow compression mold 4 to be discussed later is inserted into the upper opening of the cylindrical mold 3.

Considering the coefficient of thermal expansion etc., and because it is necessary to have an equivalent compressive distortion factor, the material of the cylindrical mold 3 is preferably the same as the material of the lower hollow compression mold 2.

The length of the cylindrical mold 3 in the vertical direction is not specifically limited. However, the cylindrical mold 3 is preferably at least long enough not to cause a leak of slurry when a prescribed amount of slurry is poured into the cylindrical mold 3.

The slurry diffusion pin or the slurry diffusion member 7 is disposed in the center of the cylindrical mold 3. The slurry diffusion member 7 is located on the upper surface of the bushing 31 placed on the bushing support member 5. As described in relation to the upper surface of the bushing support member 5, the lower surface of the slurry diffusion member 7 is preferably provided with a groove 7A that prevents displacement of the bushing 31. If the bushing 31 is made of a magnetic material, a magnet may be provided on the lower surface of the slurry diffusion member 7 in place of a groove.

The upper surface of the slurry diffusion member 7 has an upward pointing conical or pyramidal shape. When the slurry is poured into the cylindrical mold 3 onto the slurry diffusion member 7 from above the cylindrical mold 3, the short fibers in the slurry are uniformly dispersed around the bushing 31. A spiral groove may be provided in the surface of the slurry diffusion member 7. If the spiral groove is provided, the slurry flows in a swirling manner to further improve the dispersibility.

It is not necessary that the slurry diffusion member 7 should be fixed to the upper surface of the bushing 31 unless any displacement is caused, and the slurry diffusion member 7 may be simply placed on the upper surface of the bushing.

(Upper Hollow Compression Mold)

Figure 3A:
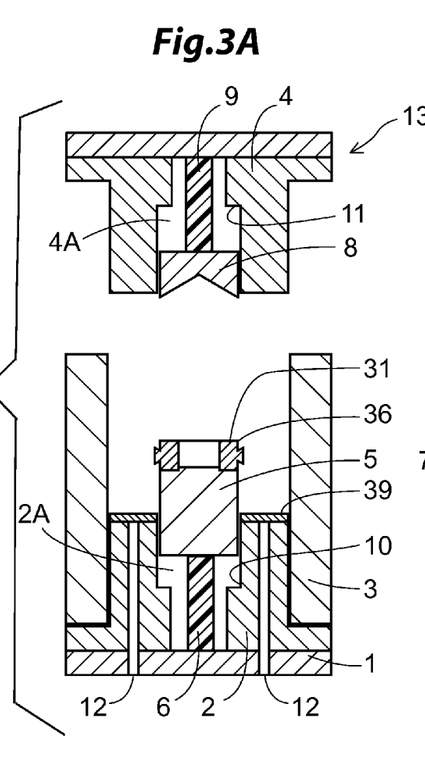
FIGS. 3A, 3B, 3C and 3D are schematic process views illustrating operation of a filtering-dehydration compressor according to an embodiment of the present invention.

As shown in FIG. 3A, the upper hollow compression mold 4 is disposed opposite to the lower hollow compression mold 2, and inserted into the upper opening of the cylindrical mold 3. The outer periphery of the upper hollow compression mold 4 and the inner wall of the cylindrical mold 3 tightly contact each other when the upper hollow compression mold 4 is inserted to hinder a leak of the slurry.

Considering the coefficient of thermal expansion etc., and because it is necessary to have an equivalent compressive distortion factor, the material of the upper hollow compression mold 4 is preferably the same as the material of the lower hollow compression mold 2 and the cylindrical mold 3.

The depressing member 8 is provided in the hollow portion of the upper hollow compression mold 4. The depressing member 8 contacts the slurry diffusion member 7 (FIG. 3C). The upper surface of the depressing member 8 is supported by the upper elastic member 9. The position of the depressing member 8 is varied through expansion and contraction of the upper elastic member 9.

The upper elastic member 9 may be the same as or different from the lower elastic member 6 discussed earlier. Under use conditions in which the lower hollow compression mold 2 is heated or the elastic member 9 is subjected to a strong compressive force, however, a spring may preferably be used in terms of the durability. The upper elastic member 9 and the lower elastic member 6 may preferably be springs having the same spring constant. Such elastic members allow the fiber aggregate to be compressed from above and from below at an equal speed, which reduces fluctuation in fiber density in the vertical direction.

The depressing member 8 and the upper elastic member 9 may be bonded or secured to each other. However, the depressing member 8 and the upper elastic member 9 are preferably removably connected to each other so that the depressing member 8 can be exchanged according to the type of the bushing.

The upper hollow compression mold 4 and the depressing member 8 are arranged such that at least a portion of the depressing member 8 is inserted into the hollow portion 4A of the upper hollow compression mold 4 as seen in the horizontal direction, and the amount of insertion of the depressing member 8 into the hollow portion 4A is varied through expansion and contraction of the elastic member 9. In an arrangement, the depressing member 8 may be moved out of the hollow portion 4A of the upper hollow compression mold 4 as seen in the horizontal direction through expansion of the elastic member 9 during normal operation. Such an arrangement is not practical because displacement may be caused when the depressing member 8 is moved back into the upper hollow compression mold 4 through contraction of the elastic member 9.

A stepped portion 11 is provided on the inner wall of the upper hollow compression mold 4 which defines the hollow portion 4A. The stepped portion 11 contacts the upper portion of the depressing member 8 to hinder an ascent of the bushing support member 8 through contraction of the upper elastic member 9. The stepped portion 11 is preferably formed by varying the inside diameter of the hollow portion 4A or providing projections on the inner wall.

The stepped portion 11 is not necessarily provided over the entire circumference of the inner wall, and may be provided on a part of the inner wall. If the stepped portion 11 is provided on a part of the inner wall, the stepped portion 11 is preferably provided at three or more locations at equal angular intervals in order to keep the depressing member 8 horizontal. Specifically, the stepped portion 11 may be provided at three locations at intervals of 120 degrees, at four locations at intervals of 90 degrees, or at six locations at intervals of 60 degrees as the hollow portion is seen from the upper and lower openings.

The position of the stepped portion 11 can be determined as discussed in relation to the stepped portion 10 of the lower hollow compression mold 2. Specifically, the stepped portion 10 of the lower hollow compression mold 2 discussed above and the stepped portion 11 of the upper hollow compression mold 4 are preferably located such that the distance from the upper end of the lower hollow compression mold 2 to the center of the bushing in the thickness direction with the stepped portion 10 of the lower hollow compression mold 2 and the bushing support member 5 contacting each other is equal to the distance from the lower end of the upper hollow compression mold 4 to the center of the bushing in the thickness direction with the stepped portion 11 of the upper hollow compression mold 4 and the depressing member 8 contacting each other.

The temperature of the lower surface of the upper hollow compression mold 4 is preferably adjustable. If the lower surface of the upper hollow compression mold 4 is heated during compression, a liquid content adhering to the short fibers can be quickly dried.

The temperature adjustment may be performed by varying the resistance value of a heater with a variable resistor, or simply by turning on and off a heater.

(Slurry Pouring Upper Mold)

Figure 3B:
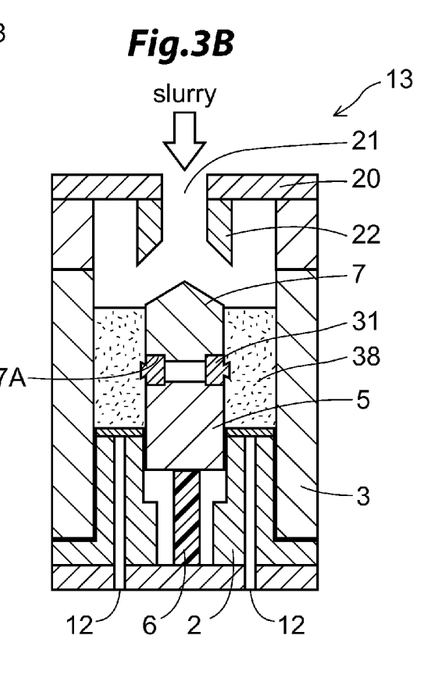
Figure 3C:
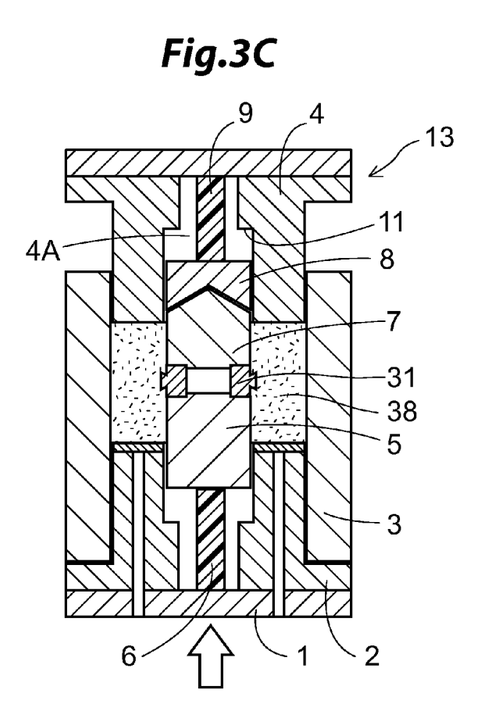

The filtering-dehydration compressor may include an upper mold 20 that allows pouring of slurry as necessary (see FIG. 3B). In order to fabricate a fiber substrate in which the weight of fibers accumulated around the bushing 31 is uniform, a slurry pouring hole 21 of a slurry pouring upper mold 20 is disposed over the slurry diffusion member 7, preferably directly above the slurry diffusion member 7.

A nozzle 23 that projects toward the slurry diffusion member 7 is preferably disposed at the distal end of the slurry pouring hole 21. The nozzle 23 is intended to prevent damage to the mold by fibers caught in the mold during the step (d) of compressing the fiber aggregate due to short fibers adhering to the slurry diffusion member 7 after pouring of the slurry. The nozzle 23 enables efficiently flushing off short fibers adhering to the slurry diffusion member 7 by pouring a small amount of a dispersion medium or water after pouring of the slurry.

The slurry pouring upper mold 20 preferably contacts tightly the cylindrical mold 3 to achieve a tightly closed state during pouring of the slurry. If the space in the cylindrical mold 3 is tightly closed, the dispersion medium can be efficiently discharged through the discharge ports 12 of the lower hollow compression mold 2 using a vacuum pump during or after pouring of the slurry. In addition, the slurry will not overflow the mold to spill out.

<Bushing>

The bushing 31 is held between the bushing support member 5 and the slurry diffusion member 7. The bushing 31 will be discussed in detail below.

The bushing 31 is located in the center of the fiber substrate in the radial direction. If the desired final product is a resin gear, the bushing is fixed to a rotary shaft to be used. The material of the bushing is not specifically limited. In consideration of the strength, however, the bushing is preferably made of metal.

Figure 1:
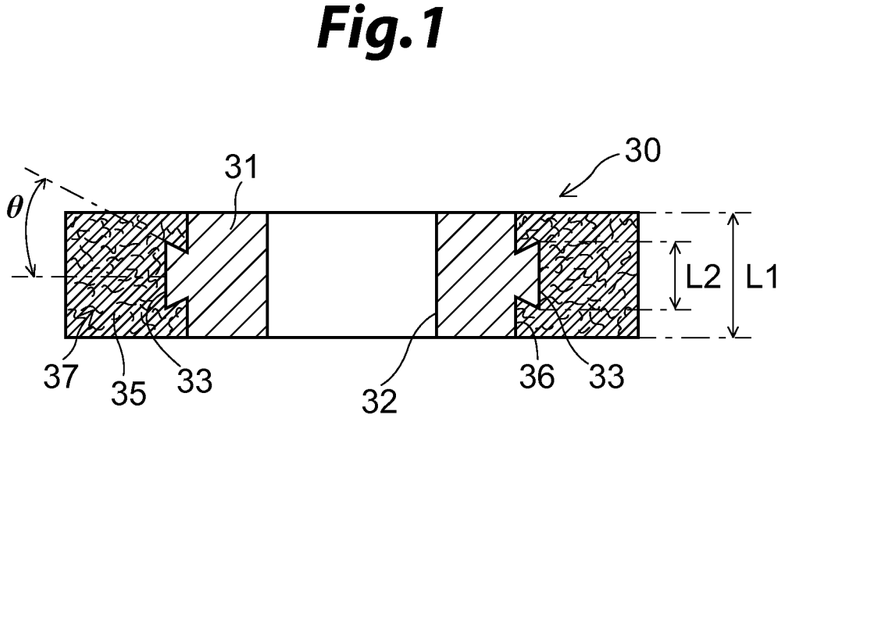
FIG. 1 is a vertical sectional view of a resin gear manufactured according to the present invention.

FIG. 1 is a schematic vertical sectional view of a resin gear 30. The resin gear 30 includes a metal bushing 31 rotatably fixed to a rotary shaft (not illustrated). A through hole 32 to be fitted with the rotary shaft (not illustrated) is formed in the center portion of the metal bushing 31.

A plurality of projecting portions 33 to serve as detent portions are integrally formed on the outer peripheral portion of the metal bushing 31 at predetermined intervals in the circumferential direction. The interval between the projecting portions 33 is determined as appropriate. If the projecting portions 33 are provided at equal angular intervals as seen from the center portion of the metal bushing 31, the strength of the projecting portions 33 against slipping can be made uniform.

The metal bushing 31 may be integrally formed with a shaft.

A specific example of the metal bushing 31 will be described. The thickness L2 of the plurality of projecting portions 33 as measured in the axial direction is smaller than the thickness L1 of the metal bushing 31 as measured in the axial direction. The projecting portions 33 which serve as detent portions have an undercut shape in which the top portion has a large thickness and the base portion has a small thickness. The undercut shape is intended to hinder idling of only the metal bushing 31 due to an interface fracture that occurs at the interface with the surrounding molded resin portion. The angle θ in the sectional surface in the direction of the rotational axis of the metal bushing 31 is 5 to 40°.

Figure 2A:
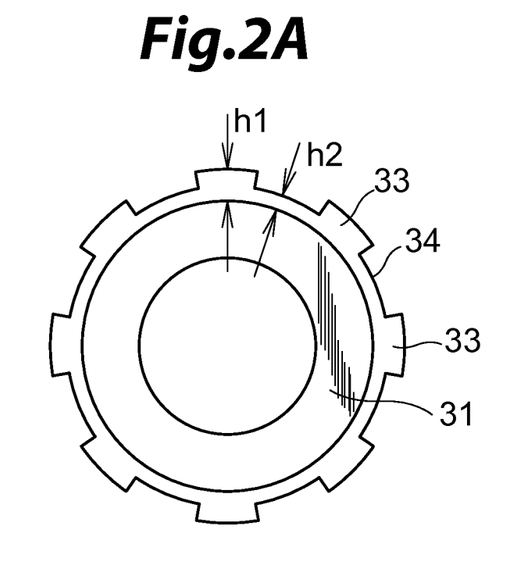
FIG. 2A is a plan view and FIG. 2B is a vertical sectional view.
Figure 2B:
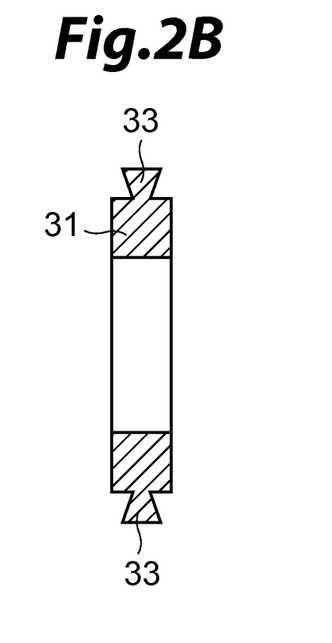

In order to enhance the effect of the detent portions to endure a load in the rotational direction, as illustrated in FIG. 2, the metal bushing 31 preferably includes the projecting portions 33 serving as detent portions and having at least a height h1, and recessed portions 34 formed at the bottom portion of the metal bushing 31 between two projecting portions 33 and having a height h2, the projecting portions 33 and the recessed portions 34 being alternately arranged. If the metal bushing 31 having the projecting portions 33 having such an undercut shape and having an angle θ of 5 to 40°, preferably 10 to 35°, is used, the plurality of projecting portions 33 which serve as detent portions are completely embedded in the fiber substrate to provide sufficient strength of the mechanical coupling between the fiber substrate and the metal bushing 31.

If a part of the fiber substrate flows into the recessed portions 34 formed between two adjacent projecting portions 33, the mechanical strength discussed above is also increased as a matter of course.

The projecting portions 33 serving as detent portions and having the undercut shape described above can be accurately formed as designed by sintering. For a resin gear having an outside diameter of 60 mm, for example, the resin gear with an optimum structure have 30 projecting portions and 29 recessed portions formed between the projecting portions. The number of projecting portions and the number of recessed portions may be changed as appropriate according to the diameter and the thickness of the resin gear and the structure of the teeth.

<Slurry>

Next, the slurry used in the present embodiment will be described. The slurry used in the present embodiment is not limited to that discussed below.

(Dispersion Medium for Slurry)

The dispersion medium used for the slurry is not specifically limited as long as the dispersion medium enables dispersion of short fibers and does not adversely affect the properties of the short fibers being used. The dispersion medium may be an organic solvent, a mixture of an organic solvent and water, water, or the like. Use of water which is particularly economical and imposes little load on the environment is preferable.

If an organic solvent is used, sufficient caution should be given to safety. An organic solvent such as methanol, ethanol, acetone, toluene, and diethyl ether may be used.

(Short Fibers)

The short fibers to be dispersed in the dispersion medium preferably have a melting point or a decomposition temperature of 250° or more. Use of such short fibers provides a fiber substrate or a resin gear with high heat resistance in which the short fibers are not thermally degraded at the molding temperature during molding, the processing temperature, and the atmospheric temperature during actual use.

As such short fibers, at least one kind of short fibers selected from para-aramid fibers, meta-aramid fibers, carbon fibers, glass fibers, boron fibers, ceramic fibers, ultra-high strength polyethylene fibers, polyketone fibers, poly(p-phenylenebenzobisoxazole) fibers, wholly aromatic polyester fibers, polyimide fibers, and polyvinyl alcohol fibers is preferably used. In particular, mixed fibers of para-aramid fibers and meta-aramid fibers have good balance among heat resistance, strength, and processability after resin molding.

The short fibers preferably contain at least 20% by volume or more of high-strength high-modulus fibers having a tensile strength of 15 cN/dtex or more and a tensile modulus of 350 cN/dtex or more. If such short fibers are used, the fiber substrate or the resin gear can endure a high load applied during use.

The single fiber fineness (thickness) of the short fibers is preferably in the range of 0.1 to 5.5 dtex, more preferably 0.3 to 2.5 dtex. If the single fiber fineness is less than 0.1 dtex, there are many difficulties in yarn making, and not only it is difficult to use high-quality fibers because of occurrence of yarn breakage and fuzz, but also the cost is disadvantageously increased. If the single fiber fineness is more than 5.5 dtex, the strength of the fibers is disadvantageously gradually increasingly reduced.

The length of the short fibers is not specifically limited. The length of the short fibers is preferably 1 to 12 mm, more preferably 2 to 6 mm. If the fiber length is less than 1 mm, the mechanical characteristics of the fiber-reinforced resin molded member are gradually degraded. If the fiber length is more than 12 mm, not only the short fibers are tangled so much that it is difficult to form a uniform fabric, but also the short fibers dispersed in the dispersion medium disadvantageously gradually clog a pipe for transport of the short fibers to the filtering-dehydration compressor.

The proportion of the short fibers contained in the resin molded member differs according to the desired strength of the molded member such as a resin gear. However, the proportion of the short fibers is preferably 30 to 50% by volume. If the proportion of the short fibers in the resin molded member is less than 30% by volume, the short fibers have almost no effect in reinforcing the resin. In addition, the short fibers are not sufficiently charged around the detent portions of the metal bushing 31 to be discussed later. If the proportion of the short fibers is more than 50% by volume, the proportion of the short fibers is so high as to cause problems in which the fiber substrate is not sufficiently impregnated with a resin during molding, for example.

Therefore, the range of the proportion of the short fibers contained in the resin molded member is preferably selected such that the molded member has high strength, the short fibers are reliably charged, and the fiber substrate is impregnated with a resin well. The range of the proportion of the short fibers is particularly preferably 35 to 45% by volume.

In order to provide a fiber substrate 35 integrated with the metal bushing 31 using the filtering-dehydration compressor illustrated in FIG. 3 with strength for maintaining its shape during movement or transfer to the next process, it is desirable that the short fibers should contain fine fibers obtained by fibrillating aramid fibers, the fine fibers having a freeness of 100 to 400 ml and being contained in an amount of 30% by mass or less in the short fibers.

In a desirable aspect, the short fibers are preferably mixed with fibrillated aramid fine fibers obtained by parting para-aramid fibers in the fiber axis direction through mechanical shearing. If the freeness is more than 400 ml, the fibers are not sufficiently fibrillated, and therefore not suitable to provide the fiber substrate 35 with strength to maintain its shape. If the freeness is less than 100 ml, the fibers are not only parted in the fiber axis direction but also sheared in the radial direction to be brought into a powder state. Therefore, the fibers are not tangled well, and not suitable to provide the fiber substrate with strength to maintain its shape. In addition, the filterability of the fibers is degraded to hinder impregnation with the resin.

If the fibrillated aramid fine fibers are contained in an amount of more than 30% by mass, the fibrillated fine fibers may be charged into a gap between the fibers, and impregnation with the resin may be hindered during resin pouring molding to cause a failure such as poor impregnation. More preferably, the fibrillated fine fibers are contained in an amount of 5 to 10% by mass in order to provide moderate strength and not to hinder impregnation with the resin.

(Dispersion Concentration of Short Fibers)

The dispersion concentration of the short fibers is preferably 0.3 to 20 g/liter. If the fiber length is less than 1 mm, the dispersion concentration can be increased to be more than 20 g/liter, but the mechanical characteristics of the resin molded member are degraded. If the fiber length of the short fibers is more than 12 mm, meanwhile, the fibers are so long that the fibers are tangled with each other and may not be sufficiently dispersed even if the dispersion concentration is reduced to be less than 0.3 g/liter.

<Resin Gear>

A resin gear suitably manufactured using the resin rotator according to the present invention will be described below.

The resin gear is obtained by impregnating a fiber substrate with a resin, curing the resin, and forming the fiber substrate into a gear shape. More specifically, the resin gear preferably has a metal bushing to be fitted with a rotary shaft that rotates the gear, and a tooth portion disposed around the metal bushing.

(Tooth Portion)

The tooth portion is disposed on the outer periphery of the metal bushing 31 discussed earlier. More specifically, as illustrated in FIG. 1 described earlier, one fiber substrate 35 is disposed at a position on the outer side of an outer peripheral portion 36 of the metal bushing 31, and fitted with the outer peripheral portion 36. Then, the fiber substrate 35 is impregnated with a resin and the resin is cured to form a resin molded member 37. The tooth portion is formed on the outer periphery of the resin molded member 37.

The tooth portion may be formed using a mold having the final teeth shape during impregnation with the resin, or fabricated by cutting or the like after the resin molded member 37 is once fabricated. In order to accurately form the tooth portion, however, the tooth portion is preferably formed by cutting. The cutting may be performed in a multiplicity of stages including rough cutting and subsequent fine cutting.

<Drive of Filtering-Dehydration Compressor>

The filtering-dehydration compressor has a drive device configured to vary the offset distance between the upper hollow compression mold 4 and the lower hollow compression mold 2 discussed earlier. The drive source is not specifically limited, and an electric pressing machine with controllable moving speed and pressing force may be used.

Either of the upper hollow compression mold 4 and the lower hollow compression mold 2 may be driven. For ease of disassembly and cleaning, however, the upper hollow compression mold 4 is preferably driven up and down.

<Method of Manufacturing Fiber Substrate>

The method of manufacturing a fiber substrate according to the present invention to be used as a gear will be described below.

Figure 3D:
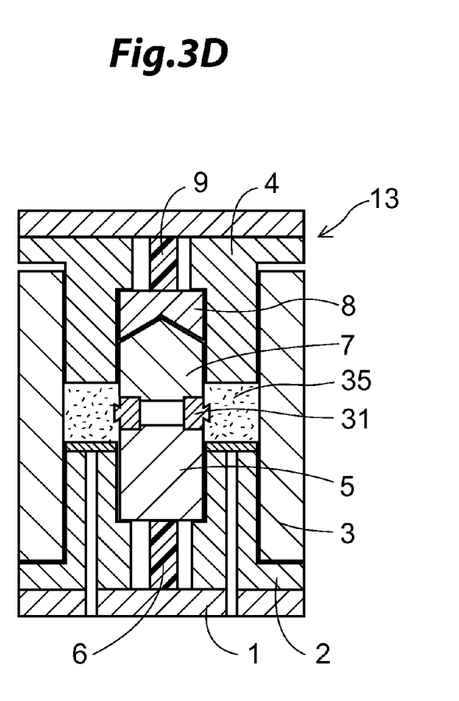

As schematically illustrated in FIG. 3D, the fiber substrate 35 is formed by forming a fiber aggregate 38 (FIG. 3C) on the outer side of the outer peripheral portion 36 of the metal bushing 31 by using the filtering-dehydration compressor 13, and compressing the fiber aggregate 38 in the axial direction of a rotary shaft (not illustrated) that rotates the metal bushing 31.

First, the step (a) of accumulating short fibers around the outer peripheral portion of a metal bushing by a filtering-dehydration method will be described.

<Step (a)>

In the step (a), slurry is poured into the cylindrical mold 3 onto the slurry diffusion member 7 from above the cylindrical mold 3. The slurry is temporarily stored in the cylindrical mold 3, or the dispersion medium is discharged from the cylindrical mold 3 along with the pouring of the slurry.

First, the filtering-dehydration compressor 13 will be discussed. As illustrated in FIG. 3A, the molds used in the filtering-dehydration compressor include the cylindrical mold 3, the bushing support member 5 and the slurry diffusion member 7, the upper hollow compression mold 4 and the lower hollow compression mold 2, and the depressing member 8. The cylindrical mold 3 prevents the fiber aggregate 38 (see FIG. 3C) from spreading outward in the radial direction of the metal bushing 31 during compressing operation. The bushing support member 5 and the slurry diffusion member 7 are disposed inside the cylindrical mold 3, and interpose a portion of the metal bushing 31 located on the inner side with respect to the outer peripheral portion 36 from both sides in the axial direction and prevent the fiber aggregate 38 from spreading inward in the radial direction of the metal bushing 31. The upper hollow compression mold 4 and the lower hollow compression mold 2 are located between the cylindrical mold 3 and the bushing support member 5 and the slurry diffusion member 7, and interpose and compress the fiber aggregate 38 from both sides in the axial direction during compressing operation. The depressing member 8 presses the slurry diffusion member 7 during compression of the fiber aggregate 38.

The lower hollow compression mold 2 has the discharge ports 12 to discharge the dispersion medium in order to provide permeability to the dispersion medium contained in the fiber aggregate 38. A vacuum suction pump (not illustrated) may be attached to the discharge ports 12 to complete discharging of the dispersion medium in a short time. In the example, a bottom member 39 is disposed on the upper surface of the lower hollow compression mold 2 to prevent an outflow of the short fibers during the discharging of the dispersion medium from the discharge ports 12.

A wire net may be used as the bottom member 39. The mesh size of the wire net is preferably 10 to 250 mesh. If the mesh size is more than 250 mesh, the resistance to filtering of the dispersion medium becomes gradually larger. This extends the time required to separate the short fibers and the liquid content from each other even if a liquid content is suctioned from the slurry, which contains short fibers and has been poured into the mold, by using a pump and discharged. As a result, the manufacturing cycle is extended. If the mesh size is less than 10 mesh, meanwhile, most of the fibers flow out together with the liquid content because of the large mesh holes even if fibers with a large fiber length are used. This may significantly reduce the fiber density of the fiber aggregate 38.

The term "mesh size" as used herein is as prescribed by JIS G 3555.

The bushing support member 5 and the slurry diffusion member 7 interpose and support a portion of the metal bushing 31 located on the inner side with respect to the outer peripheral portion 36 from both sides in the direction of extension of the center line of the cylindrical mold 3 such that the short fibers will not enter the inner side of the metal bushing 31 with respect to the outer peripheral portion 36. In the example illustrated in FIG. 3C, the bushing support member 5, the slurry diffusion member 7, and the lower hollow compression mold 2 are movable upward. However, the upper hollow compression mold 4 and the depressing member 8 may be movable downward.

To interpose the metal bushing 31 between the bushing support member 5 and the slurry diffusion member 7, the slurry diffusion member 7 is placed on the bushing to hold the metal bushing 31 using the weight of the slurry diffusion member 7 as illustrated in FIG. 3B.

As illustrated in FIG. 3B, slurry formed by dispersing short fibers in a dispersion medium is supplied from the slurry pouring hole 21 with the cylindrical mold 3 and the slurry pouring upper mold 20 tightly closed.

The slurry is supplied onto the slurry diffusion member 7 from above the slurry diffusion member 7 through the nozzle 22, which causes the short fibers to be spread as uniformly distributed around the slurry diffusion member 7.

<Step (b)>

In the step (b), a dispersion medium that is the same as the dispersion medium used in the step (a) or water is poured onto the slurry diffusion member from above the slurry diffusion member to cause the short fibers adhering to the slurry diffusion member to fall down.

After the slurry is poured in the step (a), fibers remain adhering to the upper portion of the slurry diffusion member 7. If fibers remain on the slurry diffusion member 7, short fibers may be caught between the upper hollow compression mold 4 and the depressing member 8 and the slurry diffusion member 7 in the next steps (c) and (d) of discharging the dispersion medium and compressing the fiber aggregate during or after the discharging of the dispersion medium, which may damage the molds to interrupt continuous production. Thus, after the slurry is poured, a dispersion medium that is the same as the dispersion medium for the slurry or water is poured from the slurry pouring hole 21 to wash away the short fibers remaining on the upper portion of the slurry diffusion member 7.

Pouring of the dispersion medium or water to wash away the short fibers is preferably started at the timing when the liquid level of the slurry in the mold reaches the upper surface of the fiber aggregate accumulated in the mold.

The dispersion medium or water poured to wash away the short fibers is poured in such a small amount that the dispersion medium or water will not spill out of the mold. The dispersion medium or water may be poured twice or more times (a plurality of times) to reliably wash away the short fibers remaining on the upper portion of the slurry diffusion member 7.

If the dispersion medium or water is poured twice or more times, the second and subsequent pourings are preferably performed after the liquid level of the dispersion medium or water poured earlier is lowered to the upper surface of the fiber aggregate accumulated in the mold.

<Steps (c) and (d)>

In the step (c), the dispersion medium is discharged from the cylindrical mold to accumulate the short fibers in the cylindrical mold to obtain a fiber aggregate.

In the step (d), the fiber aggregate is compressed.

More specifically, as illustrated in FIG. 3B, the space in the cylindrical mold is subjected to vacuum suctioning to discharge a liquid content from the plurality of discharge ports 12 provided in the lower hollow compression mold 2 to fabricate a fiber aggregate 38 that surrounds the outer peripheral portion of the metal bushing 31.

Using the bushing support member 5 and the slurry diffusion member 7 in this way facilitates positioning and support of the metal bushing 31.

The shape of the outer peripheral surface of the fiber aggregate 38 is determined by the shape of the inner peripheral surface of the cylindrical mold 3. Therefore, the outer peripheral surface of the fiber aggregate 38 can be formed into a gear shape with projections and recesses by forming the inner peripheral surface of the cylindrical mold 3 into a gear shape.

If the molds used in the filtering-dehydration compressor discussed above are used, the short fibers can be reliably prevented from flowing both outward and inward in the radial direction of the metal bushing 31 when the fiber aggregate 38 is compressed by the upper hollow compression mold 4 and the lower hollow compression mold 2.

After a liquid content is discharged from the plurality of discharge ports 12 provided in the lower hollow compression mold 2, the bushing support member 5, the slurry diffusion member 7, and the lower hollow compression mold 2 are moved upward as illustrated in FIG. 3C. Then, first, the slurry diffusion member 7 and the depressing member 8 contact each other to fix the metal bushing 31 by the forces of the upper elastic member 9 and the lower elastic member 6. In the example illustrated in FIG. 3, springs having an equal spring constant are used as the upper elastic member 9 and the lower elastic member 6.

Further, the bushing support member 5, the slurry diffusion member 7, and the lower hollow compression mold 2 are raised until the bushing support member 5 and the stepped portion 10 provided on the lower hollow compression mold 2 contact each other and the depressing member 8 and the stepped portion 11 provided on the lower hollow compression mold 4 contact each other so that the distance between the lower hollow compression mold 2 and the upper hollow compression mold 4 will not be reduced any further (see FIG. 3D).

The thickness of the fiber substrate 35 will be described in detail with reference to FIG. 4A and FIG. 4B.

Figure 4A:
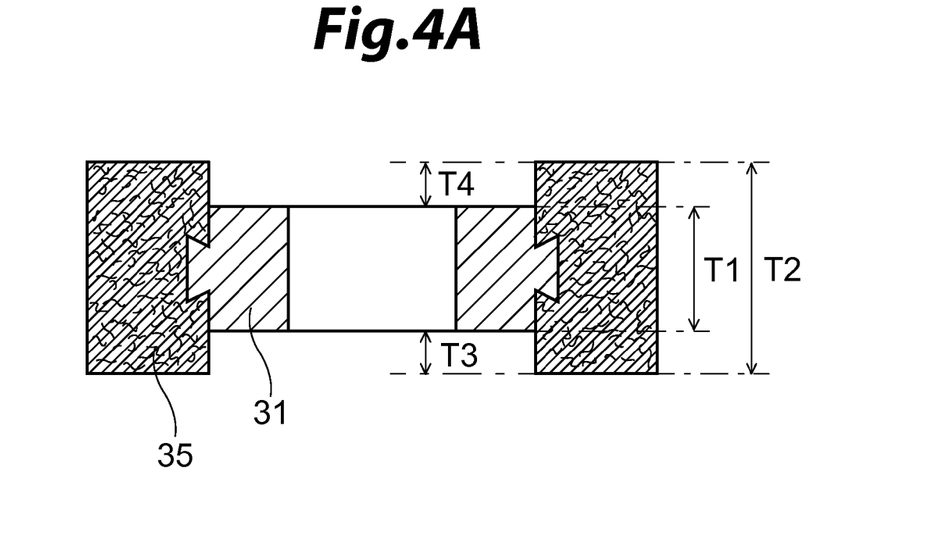
FIG. 4A is a vertical sectional view of a fiber substrate integrated with a bushing.
Figure 4B:
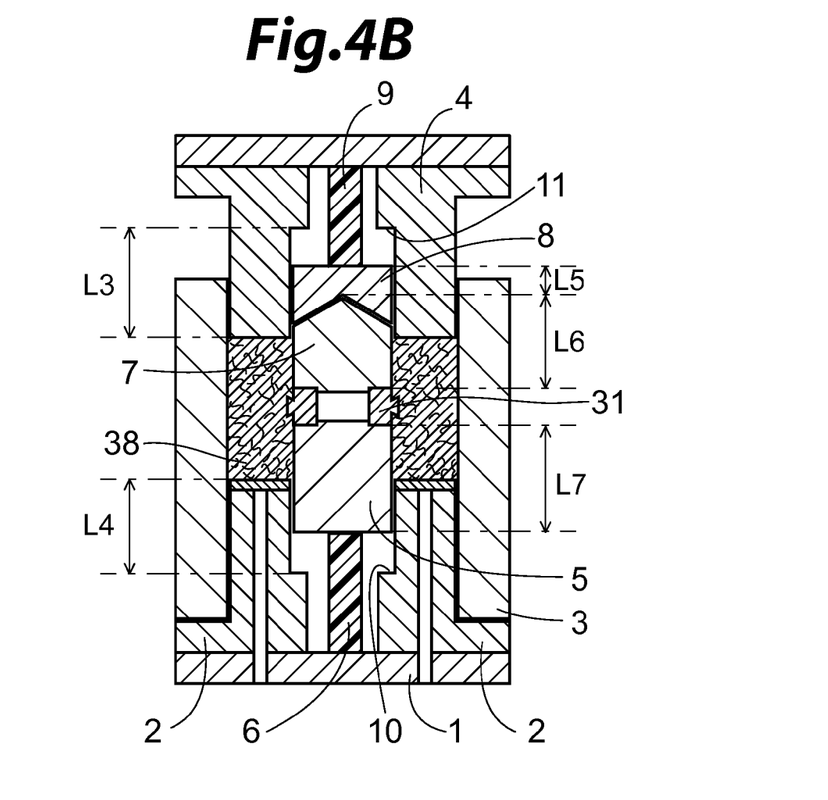
FIG. 4B is a vertical sectional view of the filtering-dehydration compressor.

As illustrated in FIG. 4A, the relationship between the thickness T1 of the metal bushing 31 and the thickness T2 of the fiber substrate 35 (in the compressed state) determined by the stepped portions 10 and 11 (see FIG. 3A) may be selected as desired from the following three patterns: (i) T1=T2; (ii) T1>T2; and (iii) T1<T2.

The relationship between the distance T3 from the lower surface of the metal bushing 31 to the lower surface of the fiber substrate 35 in the compressed state and the distance T4 from the upper surface of the metal bushing 31 to the upper surface of the fiber substrate 35 in the compressed state may be selected as desired from the following three patterns: (iv) T3=T4; (v) T3>T4; and (vi) T3<T4. The selection can be made by changing the respective heights L3 and L4 of the stepped portions 10 and 11 (see FIG. 4B).

Further, the selection from (i) to (iii) and the selection from (iv) to (vi) discussed above may be made in combination.

The duration and the temperature of the compression may be changed as desired according to the type of the short fibers being used. By compressing the fiber substrate 35 while being heated by a heater attached to the upper hollow compression mold 4, it is possible to shorten the time required to remove a liquid contained in the fiber substrate 35 after filtering-dehydration has been performed, and to suppress temporal variations in thickness of the fiber substrate 35 after being compressed. The fiber substrate 35 is preferably compressed for 0.1 to 10 minutes at 100 to 180° C., that is, at temperatures higher than the boiling point of the dispersion medium being used, which is water in the example, which results in almost no temporal variations in thickness of the fiber substrate 35.

In addition, by performing vacuum suctioning from the discharge ports 12 of the lower hollow compression mold 2 during the compression, it is possible to shorten the time required to remove a liquid contained in the fiber substrate 35 after filtering-dehydration has been performed.

The step (c) and the step (d) may be performed at the same time, or the step (d) may be performed after the step (c) is performed.

If the steps (c) and (d) are sequentially performed, the dispersion medium and the fiber substrate can be sufficiently separated from each other in advance. Thus, the fibers can be compressed with the temperature of the upper hollow compression mold 4 reduced to a lesser degree if the upper hollow compression mold 4 is heated during compression in the step (d).

If the steps (c) and (d) are performed at the same time, the time for one step can be saved, and the fiber substrate can be manufactured in a shorter time.

<Step (e)>

The step (e) of impregnating the fiber substrate with a resin and curing the resin will be described below.

Figure 5:
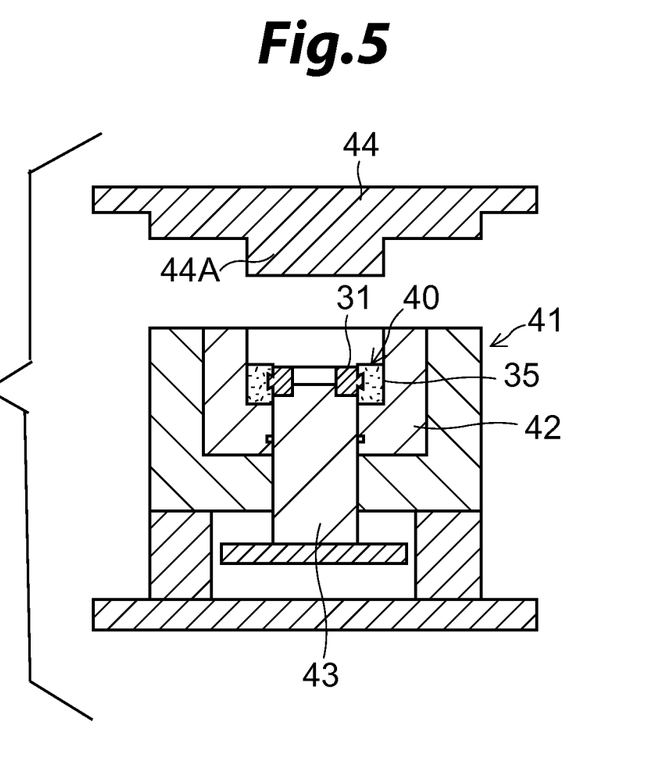
FIG. 5 is a schematic process view illustrating fabrication of a resin gear according to the embodiment of the present invention.

As illustrated in FIG. 5, a resin rotator molding material 40 including the fiber substrate 35 is disposed in a mold 41. After that, a liquid resin is injected into the mold 41 to impregnate the fiber substrate with the resin. After that, the resin is cured to form a resin rotator including a resin molded member.

The mold 41 includes a fixed mold 42, a movable mold 43 disposed in the center of the fixed mold 42 to be displaceable in the vertical direction, and an upper mold 44 paired with the movable mold 43 to hold the metal bushing 31 between the movable mold 43 and the upper mold 44.

When a pressing portion 44A of the upper mold 44 is inserted into the fixed mold 42 to press the metal bushing 31, the movable mold 43 is displaced downward according to the amount of insertion of the upper mold 44.

After an opening portion of the fixed mold 42 is completely blocked by the upper mold 44, a liquid resin is injected into the fixed mold 42. In this event, the liquid resin can be quickly injected if the fixed mold 42 has been evacuated.

After that, when the resin is cured, a resin rotator including a resin molded member molded with the fiber substrate 35 as a core member is taken out of the upper mold 41 to complete manufacture of the resin rotator.

The fiber substrate 35 may be impregnated with any thermosetting resin, thermoplastic resin, or the like. A combination of one or more resins selected from the following resins and a curing agent that matches the type of the selected resins may be used: an epoxy resin, a polyaminoamide resin, a phenol resin, an unsaturated polyester resin, a polyimide resin, a polyether sulfone resin, a polyether ether ketone resin, a polyamide-imide resin, a polyamide resin, a polyester resin, a polyphenylene sulfide resin, a polyethylene resin, a polypropylene resin, and so forth.

Among these, a polyaminoamide resin is preferable from the viewpoint of the strength, heat resistance, etc. of the cured resin. As a catalyst, 5 parts by mass or less of n-octyl bromide, for example, as a curing accelerator is preferably used for 100 parts by mass of a mixture of 2,2'-(1,3-phenylene)bis(2-oxazoline), which has high heat resistance and strength, and an amine curing agent. If the catalyst is added in an amount of more than 5 parts by mass, the curing time becomes so short that the resin is cured before the fiber substrate 35 is sufficiently impregnated with the resin, which may cause the fiber substrate 35 to be insufficiently impregnated with the resin.

<Step (f)>

The step (f) of forming teeth on the outer peripheral portion of the fiber substrate impregnated with the resin will be described below.

The teeth may be provided or formed either during molding or by cutting after the molding. In order to achieve higher accuracy, however, the teeth are preferably provided by cutting.

The cutting is preferably performed in three stages, namely first processing for an outer peripheral portion, second processing for forming a tooth shape, and third processing for finishing a tooth surface.

In the first processing, more specifically, lathing is performed to cut the outer peripheral surface and the inner peripheral portion to predetermined dimensions. In this stage, not teeth but a simple circumference is fabricated.

In the second processing, more specifically, a tooth shape is formed using a gear hobbing machine. Examples of the gear hobbing machine include GE15A (product name) manufactured by Mitsubishi Heavy Industries, Ltd.

In the third processing, more specifically, a tooth surface is finished using a shaving machine. Examples of the shaving machine include FE30A (product name) manufactured by Mitsubishi Heavy Industries, Ltd. Because the shaving is the final finishing, the cutting amount is as small as about 20 to 150 μm.

EXAMPLES

Examples according to the present invention will be described below.

Example 1

In order to prepare slurry, a tank filled with water in such an amount that short fibers would be dispersed at a concentration of 4 g/liter was prepared. Then, short fibers in such an amount that the total amount of the short fibers in the resin molded member would be 40% by volume were poured into the tank. Specifically, 45% by mass of para-aramid short fibers ("Technora (trademark of Teijin Ltd.)" manufactured by Teijin Ltd.) having a single fiber fineness of 1.7 dtex and a fiber length of 3 mm, 50% by mass of meta-aramid short fibers ("Teijinconex (trademark of Teijin Ltd.)" manufactured by Teijin Ltd.) having a single fiber fineness of 2.2 dtex and a fiber length of 3 mm, and 5% by mass of fine fibers obtained by fibrillating "Kevlar (trademark of DuPont) pulp" manufactured by DuPont to a freeness value of 300 ml were poured into the tank. Then, water in the tank was stirred by a stirrer to disperse the short fibers to prepare slurry.

Next, the filtering-dehydration compressor illustrated in FIG. 3A was used to position the metal bushing 31 on the bushing support member 5, and to place the slurry diffusion member 7 on the metal bushing 31 so as not to be displaced, to hold the metal bushing 31 between the bushing support member 5 and the slurry diffusion member 7. A conically shaped portion of the slurry diffusion member 7 projecting upward had an angle of 90°.

The projecting portions 33 and the recessed portions 34 of the metal bushing 31 being used had h1 and h2 values of 2 mm and 0.5 mm, respectively. The projecting portions 33 had an undercut shape. The angle θ between an imaginary center transverse sectional surface and a side surface of the metal bushing 31 was 20°.

The lower hollow compression mold 2 was located such that the distance from the center of the metal bushing 31 in the axial direction to the upper surface of the bottom member 39 was 40 mm.

The slurry described above was poured into the filtering-dehydration compressor with the slurry pouring upper mold 20 illustrated in FIG. 3B and the cylindrical mold 3 tightly contacting each other. Then, the space in the cylindrical mold 3 was subjected to vacuum suctioning to discharge water from the plurality of discharge ports 12 provided in the lower hollow compression mold 2, separating the short fibers and the water to obtain a cylindrical fiber aggregate 38. After the short fibers and the water were separated from each other by the vacuum suctioning, water was poured from the slurry pouring hole 21 to wash away the short fibers remaining on the upper side of the slurry diffusion member 7. The slurry pouring hole 21 was disposed directly above the slurry diffusion member 7.

In order to prevent an outflow of the short fibers from the discharge ports 12 during the discharging of the water, the bottom member 39 was disposed on the lower hollow compression mold 2. A wire net made of metal and having a mesh size of 100 mesh was used as the bottom member 39.

Next, the fiber aggregate 38 was compressed so that the short fibers were further more deeply engaged with the detent portions of the metal bushing 31. As illustrated in FIG. 3C, the lower hollow compression mold 2, the cylindrical mold 3, the bushing support member 5, the metal bushing 31, the slurry diffusion member 7, and the fiber aggregate 38 were raised together with the base 1 to a position at which the distance from the center of the metal bushing 31 in the axial direction to the lower surface of the upper hollow compression mold 4 which was heated to 150° C. was 40 mm. At the position, the metal bushing 31 was located at the middle between the upper hollow compression mold 4 and the lower hollow compression mold 2.

As illustrated in FIG. 3D, the base 1 was raised at 1 to 5 mm/s with the metal bushing 31 located at the middle between the upper hollow compression mold 4 and the lower hollow compression mold 2 until the thickness of the fiber aggregate 38 was reduced to 10 mm.

Then, the fiber aggregate 38 was compressed in the heated state for two minutes to obtain a resin rotator molding material integrated with the metal bushing 31.

During the compression, vacuum suctioning was performed from the discharge ports 12 in the lower hollow compression mold 2. In addition, as illustrated in FIG. 4B, the length L7 of the bushing support member 5 was 100 mm, the length L6 of the slurry diffusion member 7 was 70 mm, the length L5 of the depressing member 8 was 30 mm, the thickness T1 of the metal bushing 31 was 10 mm, and the respective heights L3 and L4 of the stepped portions of the upper hollow compression mold 4 and the lower hollow compression mold 2 were both 100 mm.

<Fabrication of Fiber Substrate>

The filtering-dehydration compressor and the slurry discussed above were used to fabricate ten fiber substrates.

Comparative Example 1

Fiber substrates were fabricated by the same method as in Example 1 except that the short fibers adhering to and remaining on the slurry diffusion member 7 were not washed away.

The slurry was poured by the method discussed above in relation to Example 1 and Comparative Example 1, and the number of times in which the short fibers remained on the slurry diffusion member 7 (the number of fiber substrates, out of ten, in which the fibers remained on the slurry diffusion member 7) was obtained. The measurement results are indicated in Table 1 below.

TABLE 1

| Item | Example 1 | Comparative Example 1 |
| --- | --- | --- |
| Number of fiber substrates with remaining fibers | 0/10 | 10/10 |

As seen from Table 1, the short fibers remained on the slurry diffusion member 7 in all of the ten fiber substrates in Comparative Example 1 in which the short fibers had not been washed away. The short fibers did not remain on the slurry diffusion member 7 in any of the ten fiber substrates in Example 1 in which cleaning water had been poured. Therefore, in the present invention which includes the step (b) of washing away the short fibers adhering to and remaining on the slurry diffusion member, as opposed to Comparative Example 1, the fibers do not remain on the slurry diffusion member 7. Accordingly, there is only little fluctuation in amount of short fibers among individual products of fiber substrate and a mold is not damaged, thereby enabling continuous production.

While the preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method of manufacturing a fiber substrate comprising the steps of:
preparing slurry by dispersing short fibers in a dispersion medium; pouring the slurry into a cylindrical mold from above the cylindrical mold, the slurry being directed to a slurry diffusion member disposed at the center of the cylindrical mold and having an upward pointing conical or pyramidal shape;

pouring the dispersion medium that is the same as the dispersion medium used to prepare the slurry, the dispersion medium consisting essentially of organic solvent, onto the slurry diffusion member from above the slurry diffusion member to cause the short fibers adhering to the slurry diffusion member to fall down, after the step of pouring the slurry; and discharging the dispersion medium from the cylindrical mold to accumulate the short fibers in the cylindrical mold to obtain a fiber aggregate.

2. The method of manufacturing a fiber substrate according to claim 1, further comprising the step of:

compressing the fiber aggregate during or after the step of discharging the dispersion medium.

3. The method of manufacturing a fiber substrate according to claim 1, wherein in the step of discharging, the discharging of the dispersion medium is performed under a reduced-pressure atmosphere.

4. The method of manufacturing a fiber substrate according to claim 2, wherein in the step of discharging, the discharging of the dispersion medium is performed under a reduced-pressure atmosphere.

5. The method of manufacturing a fiber substrate according to claim 2, wherein in the step of compressing, the compression of the fiber aggregate is performed while applying heat.

6. The method of manufacturing a fiber substrate according to claim 1, wherein the fiber aggregate is shaped like a gear in the cylindrical mold.

7. The method of manufacturing a fiber substrate according to claim 2, wherein the fiber aggregate is shaped like a gear in the cylindrical mold.

8. The method of manufacturing a fiber substrate according to claim 3, wherein the fiber aggregate is shaped like a gear in the cylindrical mold.

9. The method of manufacturing a fiber substrate according to claim 4, wherein the fiber aggregate is shaped like a gear in the cylindrical mold.

10. The method of manufacturing a fiber substrate according to claim 5, wherein the fiber aggregate is shaped like a gear in the cylindrical mold.

11. A method of manufacturing a resin rotator, comprising the step of:

impregnating the fiber substrate manufactured by the method according to claim 1 with a resin and curing the resin.

12. The method of manufacturing a resin rotator according to claim 11, further comprising the step of:

performing tooth cutting on an outer peripheral portion of the fiber substrate after the step of impregnating and curing.

13. A method of manufacturing a resin rotator, comprising the step of:

impregnating the fiber substrate manufactured by the method according to claim 2 with a resin and curing the resin.

14. The method of manufacturing a resin rotator according to claim 13, further comprising the step of:

performing tooth cutting on an outer peripheral portion of the fiber substrate after the step of impregnating and curing.

15. A method of manufacturing a resin rotator, comprising the step of:

impregnating the fiber substrate manufactured by the method according to claim 3 with a resin and curing the resin.

16. The method of manufacturing a resin rotator according to claim 15, further comprising the step of:

performing tooth cutting on an outer peripheral portion of the fiber substrate after the step of impregnating and curing.

17. A method of manufacturing a resin rotator, comprising the step of:

impregnating the fiber substrate manufactured by the method according to claim 5 with a resin and curing the resin.

18. The method of manufacturing a resin rotator according to claim 17, further comprising the step of:

performing tooth cutting on an outer peripheral portion of the fiber substrate after the step of impregnating and curing.

19. A method of manufacturing a resin rotator, comprising the step of:

impregnating the fiber substrate manufactured by the method according to claim 6 with a resin and curing the resin.

20. The method of manufacturing a resin rotator according to claim 19, further comprising the step of:

performing tooth cutting on an outer peripheral portion of the fiber substrate after the step of impregnating and curing.

* * * * *